United States Patent
Beck et al.

(10) Patent No.: US 10,528,323 B2
(45) Date of Patent: ***Jan. 7, 2020

(54) CIRCUIT FOR ADDITION OF MULTIPLE BINARY NUMBERS

(71) Applicant: INTERNATIONAL BUSINESS MACHINES CORPORATION, Armonk, NY (US)

(72) Inventors: Manuel Beck, Kirchheim (DE); Wilhelm Haller, Remshalden (DE); Ulrich Krauch, Dettenhausen (DE); Kurt Lind, Tuebingen (DE); Friedrich Schroeder, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/145,311

(22) Filed: Sep. 28, 2018

(65) Prior Publication Data

US 2019/0034165 A1 Jan. 31, 2019

Related U.S. Application Data

(63) Continuation of application No. 15/381,424, filed on Dec. 16, 2016.

(30) Foreign Application Priority Data

Sep. 26, 2016 (GB) .................................. 1616274.5

(51) Int. Cl.
*G06F 7/50* (2006.01)
*G06F 7/509* (2006.01)

(52) U.S. Cl.
CPC ................ *G06F 7/50* (2013.01); *G06F 7/509* (2013.01)

(58) Field of Classification Search
None
See application file for complete search history.

(56) References Cited

U.S. PATENT DOCUMENTS

| | | | |
|---|---|---|---|
| 5,528,177 | A | 6/1996 | Sridhar |
| 6,711,633 | B2 | 3/2004 | Bradley et al. |
| 7,284,029 | B2 | 10/2007 | Belluomini et al. |
| 7,373,368 | B1 | 5/2008 | Rarick et al. |

(Continued)

OTHER PUBLICATIONS

Menon et al., "High performance 5:2 compressor architectures", IEEE Procedures, Circuit Devices Systems, vol. 153, No. 5 (Oct. 2006) (pp. 447-452).

(Continued)

*Primary Examiner* — Michael D. Yaary
(74) *Attorney, Agent, or Firm* — Margaret A. McNamara, Esq.; Kevin P. Radigan, Esq.; Heslin Rothenberg Farley & Mesiti P.C.

(57) ABSTRACT

A circuit is provided for addition of multiple binary numbers. The circuit includes a 4-to-2-compressor configured for calculating a compressed representation from four binary numbers received via operand inputs of the 4-to-2-compressor. The 4-to-2-compressor includes a first sub-circuit and a second sub-circuit. Each of the first sub-circuit and the second sub-circuit is configured for transmitting a bitwise inverted representation, of a compressed representation, from three binary numbers.

14 Claims, 3 Drawing Sheets

(56) References Cited

U.S. PATENT DOCUMENTS

| | | | |
|---|---|---|---|
| 7,620,677 B2* | 11/2009 | Kwon | G06F 7/607 |
| | | | 708/620 |
| 8,032,819 B2 | 10/2011 | Abe | |
| 8,082,283 B1 | 12/2011 | Langhammer | |
| 8,533,250 B1 | 9/2013 | Foo | |
| 9,274,802 B2 | 3/2016 | Wegener | |
| 2003/0014459 A1* | 1/2003 | Fletcher | G06F 7/607 |
| | | | 708/708 |
| 2005/0044125 A1 | 2/2005 | Awaka | |
| 2007/0233760 A1 | 10/2007 | Mathew et al. | |
| 2009/0063609 A1 | 3/2009 | Tam | |
| 2010/0146030 A1 | 6/2010 | Erle | |
| 2011/0264719 A1 | 10/2011 | Mortensen | |
| 2017/0161021 A1 | 6/2017 | Franklin | |
| 2017/0293471 A1 | 10/2017 | Hormigo Aguilar et al. | |
| 2018/0088907 A1 | 3/2018 | Beck et al. | |

OTHER PUBLICATIONS

Marimuthu et al., "Design of 8-4 and 9-4 Compressors for High Speed Multiplication", American Journal of Applied Sciences vol. 10, Issue 8 (2013) (pp. 893-900).

Beck et al., "List of IBM Patents or Patent Applications Treated as Related", U.S. Appl. No. 16/145,311, filed Sep. 28, 2018, dated Sep. 28, 2018 (2 pages).

* cited by examiner

CIRCUIT FOR ADDITION OF MULTIPLE BINARY NUMBERS

BACKGROUND

The invention relates to a circuit for addition of multiple binary numbers

There are numerous applications where binary numbers need to be added. A circuit for addition of three binary numbers each having four digits may include three 3-to-2-compressors for each of the four digits of the three binary numbers Each 3-to-2-compressor may include three operand inputs a, b, c for the k-th (0<k<3) digits of the three binary numbers and two outputs: a sum output sum and a carry output car. The sum output sum transmit the result of a XOR-operation on the three operand inputs (sum=a XOR b XOR c) and the carry output car transmits the result of an operation car=(a AND b) OR (a AND c) OR (b AND c). In case four binary numbers have to be added, two 3-to-2-compressors for each digit may be used. The first 3-to-2-compressor may receive a bit from the respective digit three of the numbers, and the second 3-to-2-compressor may receive the carry output from the first 3-to-2-compressor and a carry output of the first 3-to-2-compressor of a lower digit.

3-to-2-compressors may be implemented in pass transistor logic, wherein transistors are used as switches to pass logic levels between nodes of a circuit, instead of as switches connected directly to supply voltages. 3-to-2-compressors implemented in pass transistor logic may be fast but consume a large surface area.

Hence, there may be a need for a less surface area consuming circuit for addition of multiple binary numbers.

SUMMARY

The above-noted need is addressed with a circuit for addition of multiple binary numbers according to the independent claim. Advantageous embodiments of the circuit are described in the dependent claims.

In one or more aspects, a circuit is provided for addition of multiple binary numbers, wherein the circuit includes a 4-to-2-compressor configured for calculating a compressed representation from four binary numbers received via operand inputs of the 4-to-2-compressor, wherein the 4-to-2-compressor includes a first sub-circuit and a second sub-circuit, wherein each of the first sub-circuit and the second sub-circuit is configured for transmitting a bitwise inverted representation of a compressed representation from three binary numbers.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
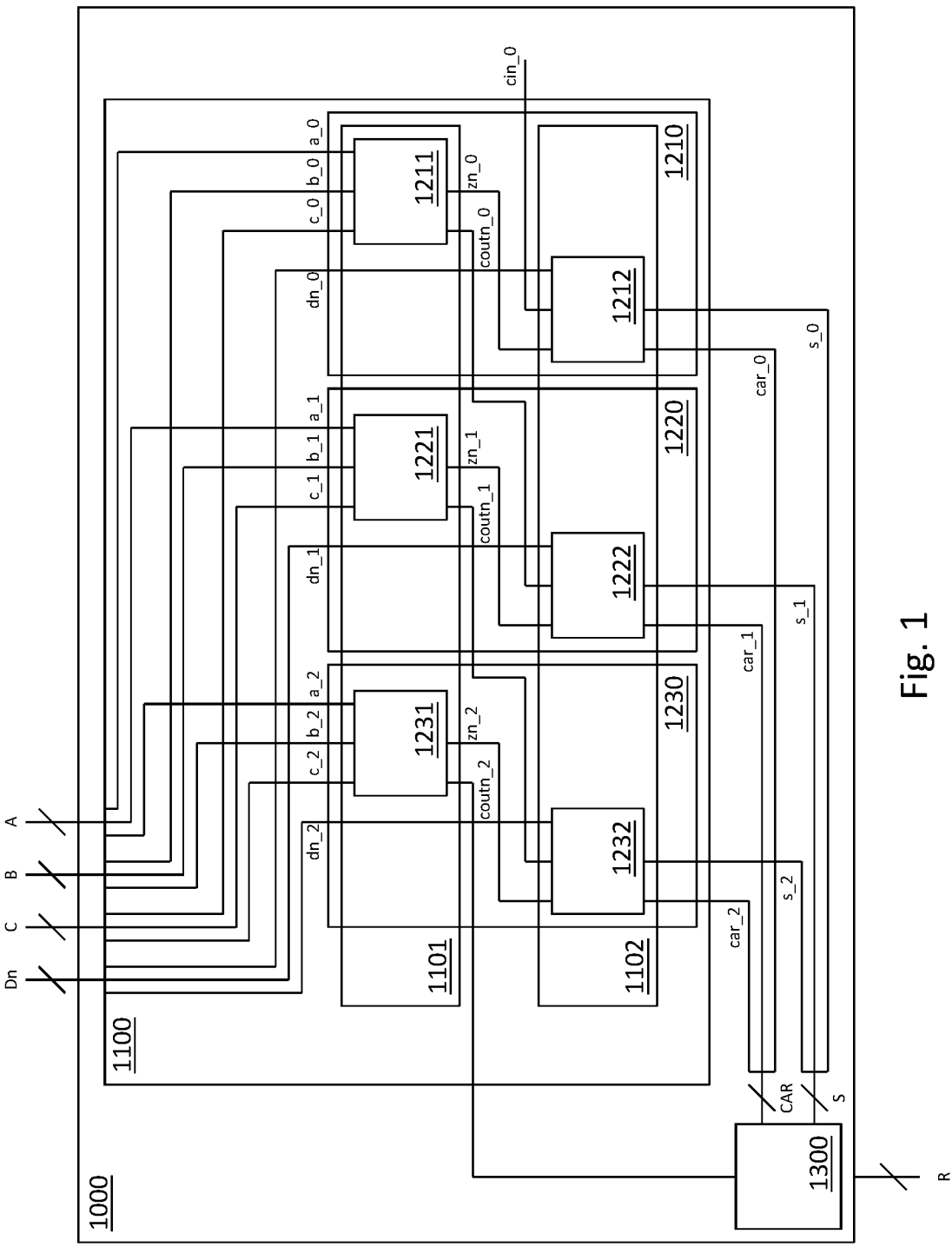
FIG. 1 shows a circuit for addition of multiple binary numbers, in accordance with one or more aspects of the present invention.

There is provided herein a circuit for addition of multiple binary numbers the circuit including a 4-to-2-compressor configured for calculating a compressed representation from four binary numbers received via operand inputs of the 4-to-2-compressor, wherein the 4-to-2-compressor includes a first sub-circuit and a second sub-circuit, wherein each of the first sub-circuit and the second sub-circuit is configured for transmitting a bitwise inverted representation of a compressed representation from three binary numbers.

Changing the logic level from true to complement with the first sub-circuit and then back from complement to true again with the second sub-circuit may avoid the need for additional inverters in the first sub-circuit and the second sub-circuit to keep the logic level the same at the inputs and the output. A reduction in the number of inverters may result in a reduction of inverter delays, which may enhance the speed of the circuit and further reduce area consumption of the circuit.

In an embodiment of the circuit for addition of multiple binary numbers, the 4-to-2-compressor includes at least one bit cell, wherein the at least one bit cell includes a first sub-cell belonging to the first sub-circuit and a second sub-cell belonging to the second sub circuit, wherein at least one of the first sub-cell and the second sub-cell includes three operand inputs, an inverted sum output and an inverted carry output.

Further, an embodiment of the circuit for addition of multiple binary numbers may prescribe that the three operand inputs of the first sub-cell and one operand input of the second sub-cell correspond to four operand inputs of the bit cell of the 4-to-2 compressor.

According to another embodiment of the circuit for addition of multiple binary numbers, one operand input of the second sub-cell corresponds to a carry input of the bit cell.

In an additional embodiment of the circuit for addition of multiple binary numbers, an inverted sum output of the second sub-cell corresponds to a sum output of the bit cell and an inverted carry output of the first sub-cell corresponds to an inverted carry output of the bit cell.

Further, an embodiment of the circuit for addition of multiple binary numbers may prescribe that the inverted sum output of the first sub-cell is connected to an operand input of the second sub-cell.

According to another embodiment of the circuit for addition of multiple binary numbers, the compressed representation includes a result word and an inverted carry word and the circuit for addition of multiple binary numbers includes a conversion circuit for converting the compressed representation into a binary representation (R) of the sum of the multiple binary numbers.

In an additional embodiment of the circuit for addition of multiple binary numbers, the second sub-cell is identical to the first sub-cell. This may facilitate a very dense layout of the circuit.

Further, an embodiment of the circuit for addition of multiple binary numbers may prescribe that the second sub-cell is different from the first sub-cell. This may allow for providing all operand inputs as true inputs.

FIG. 1 shows a circuit 1000 for addition of multiple binary numbers. The circuit includes a 4-to-2-compressor 1100 configured for calculating a compressed representation from the four binary numbers A, B, C and Dn, which each consist of three digits a_i, b_i, c_i, dn_i ($0 \leq i < 2$). The "n" in the denomination of inputs, outputs or signals indicates an inverted logic level.

The four binary numbers A, B, C and Dn are received via operand inputs of the 4-to-2-compressor 1100. The 4-to-2-compressor 1100 includes a first sub-circuit 1101 and a second sub-circuit 1102. Each of the first sub-circuit 1101 and the second sub-circuit 1102 is configured for transmitting a bitwise inverted representation of a compressed representation from three binary numbers. The first sub-circuit 1101 is configured for transmitting the bitwise inverted representation consisting of the two binary numbers COUTn, Zn of the compressed representation consisting of the two binary numbers COUT, Z from the three binary numbers A, B and C. The second sub-circuit 1102 is configured for transmitting the bitwise inverted representation consisting of the two binary numbers CAR and S of a compressed representation consisting of the two binary numbers CAR and S from the three binary numbers Dn, COUTn and Zn.

The 4-to-2-compressor 1100 includes at least one bit cell, wherein the at least one bit cell includes a first sub-cell belonging to the first sub-circuit 1101 and a second sub-cell belonging to the second sub-circuit 1102. In the embodiment shown in FIG. 1, the 4-to-2-compressor 1100 includes three bit cells 1210, 1220 and 1230. Each of the three bit cells 1210, 1220 and 1230 includes a first sub-cell 1211, 1221, and 1231, respectively, belonging to the first sub-circuit 1101 and a second sub-cell 1212, 1222 and 1232, respectively, belonging to the second sub-circuit 1102.

At least one of the first sub-cell and the second sub-cell includes three operand inputs, an inverted sum output (zn_i; s) and an inverted carry output. As shown in FIG. 1, the first sub-cells 1211, 1221 and 1231 and the second sub-cells 1212; 1222 and 1232 each may include three operand inputs an inverted sum output and an inverted carry output. The sub-cell 1220 has three operand inputs a_1, b_1, c_1, an inverted sum output zn_1 and an inverted carry output car_1, for example. The sub-cell 1221 includes three operand inputs dn_1, coutn_0 and zn_1, an inverted sum output s_i and an inverted carry output car_i, for example. The further first sub-cells 1211, 1231 and second sub-cells 1212 and 1232 have corresponding inputs and outputs.

According to the embodiment of FIG. 1, the three operand inputs a_i, b_i, c_i ($0 \leq i < 2$) of each first sub-cell 1211, 1221 and 1231 and one operand input d_i of each second sub-cell 1212, 1222 and 1232 correspond to four operand inputs a_i, b_i, c_i and dn_i of the respective bit cell 1210, 1220 and 1230 of the 4-to-2 compressor 1100. The operand input cout_(i-1) of each second sub-cell 1212, 1222 and 1232 corresponds to a carry input cout_(i-1) of the respective bit cell 1210, 1220 and 1230.

The inverted sum outputs s_i ($0 \leq i < 2$) of the second sub-cells 1212, 1222 and 1232 correspond to a sum outputs s_i of the bit cells 1210, 1220 and 1230 and the inverted carry outputs carn_i of the first sub-cells 1211, 1221 and 1231 correspond to inverted carry outputs carn_i of the bit cells 1210, 1220 and 1230.

The inverted sum outputs zn_i of the first sub-cells 1211, 1221 and 1231 are connected to operand inputs zn_i of the second sub-cell 1212, 1222 and 1232.

The compressed representation from the four binary numbers A, B, C and Dn includes a result word S consisting of the digits s_i ($0 \leq i < 2$) and an inverted carry word CARn consisting of the digits carn_i and the circuit for addition of multiple binary numbers includes a conversion circuit 1300 for converting the compressed representation S, CARn, coutn_2 into a binary representation R of the sum of the multiple binary numbers A, B, C and Dn.

Figure 2:
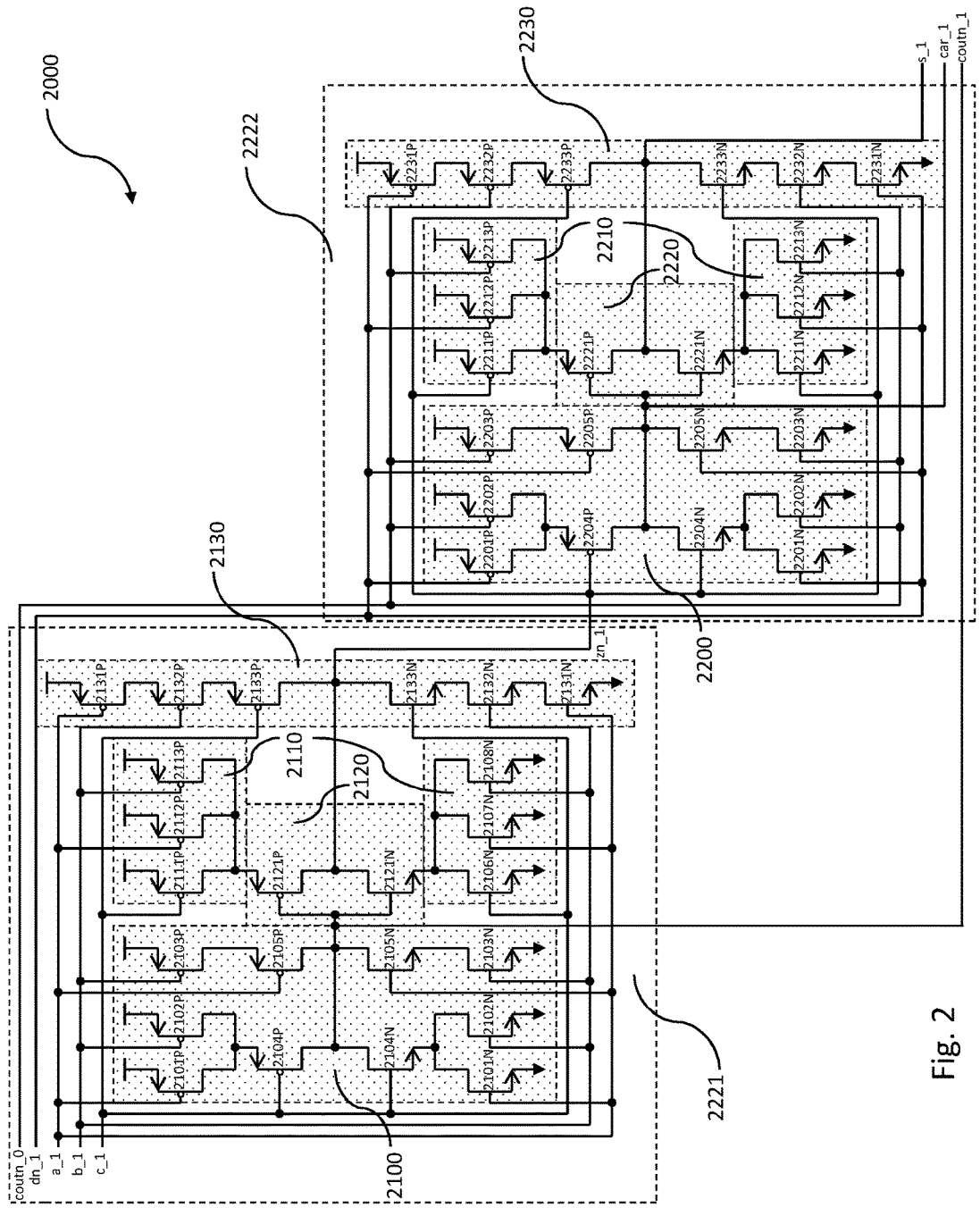
FIG. 2 shows a sub-circuit of a circuit for addition of multiple binary numbers, in accordance with one or more aspects of the present invention.

FIG. 2 discloses an embodiment of a bit cell 2000 of a circuit for addition of multiple binary numbers. The bit cell may correspond to the bit cell 1220 of FIG. 1.

The bit cell 2000 includes a first sub-cell 2221 and a second sub-cell 2222. The first sub-cell 2221 includes three operand inputs a_1, b_1 and c_1, an inverted sum output zn_1 and an inverted carry output coutn_1. Comparably, the second sub-cell 2222 includes three operand inputs dn_1, coutn_0 and zn_1, an inverted sum output s and an inverted carry output car_1. The inverted sum output s and an inverted carry output car_1 have a true logic level and are indicated without an "n", because the inputs of the second sub-cell 2222 have a complement logic level. The inverted sum output zn_1 of the first sub-cell 1221 is connected to an operand input zn_1 of the second sub-cell 1222.

The first sub-cell 2221 and the second sub-cell 2222 both include a XNOR-circuit 2100 and 2200, respectively, transmitting the result of a XNOR operation on the three operand inputs a_1, b_1, c_1 and dn_1, coutn_0, zn_1, respectively, as the inverted carry output coutn_1 and car_1, respectively.

The XNOR-circuits 2100 and 2200 each include a first PFET 2101P and 2201P, respectively, a second PFET 2102P and 2202P, respectively, a third PFET 2103P and 2203P, respectively, a fourth PFET 2104P and 2204P, respectively, a fifth PFET 2105P and 2205P, respectively, a first NFET 2101N and 2201N, respectively, a second NFET 2102N and 2202N, respectively, a third NFET 2103N and 2203N, respectively, a fourth NFET 2104N and 2204N, and respectively, a fifth NFET 2105N and 2205N; respectively, The drain of the first PFET 2101P/2201P, the drain of the second PFET 2102P/2202P and the drain of the third PFET 2103P/2203P are connected to VDD. Symmetrically, the source of the first NFET 2101N/2201N, the source of the second NFET 2102N/2202N, and the source of the third NFET 2103N/2203N are connected to ground.

Further, the source of the first PFET 2101P/2201P and the source of the second PFET 2102P/2202P are connected to the drain of the fourth PFET 2104P/2204P. Symmetrically, the drain of the first NFET 2101N/2201N and the drain of the second NFET 2102N/2202N are connected to the source of the fourth NFET 2103N/2203N.

Moreover, the source of the third PFET 2103P/2203P is connected to the drain of the fifth PFET 2105P/2205P. Symmetrically, the drain of the third NFET 2103N/2203N is connected to the source of the fifth NFET 2105N/2205N.

In addition, the drain of the fourth NFET 2104N/2204N, the drain of the fifth NFET 2105N/2205N, the source of the fourth PFET 2104P/2204P; the source of the fifth PFET 2105P/2205P are connected to one another and the inverted carry output coutn_1/car_1;

Further, the gate of the first PFET 2101P/2201P, the gate of the first NFET 2101N/2201N, the gate of the fifth PFET 2105P/2205P, the gate of the fifth NFET 2105N/2205N are connected to the first operand input a_1/dn_1.

Moreover, the gate of the second PFET 2102P/2202P, the gate of the second NFET 2102N/2202N, the gate of the third PFET 2103P/2203P and the gate of the third NFET 2103N/2203N are connected to a second operand input b_1/coutn_0.

Further, the gate of the fourth PFET 2104P/2204P and the gate of the fourth NFET 2104N/2204N are connected to a third operand input.

The first sub-cell 2221 and the second sub-cell 2222 include an AND-circuit 2120, 2220, respectively, receiving from the NAND-circuit 2110/2210 the result of a NAND operation on the three operand inputs a_1, b_1, c_1 and dn_1, coutn_0, zn_1, respectively and an inverted inverted carry output coutn_1/car_1 and transmitting the result as the inverted sum output zn_1/s.

In the embodiment shown in FIG. 2, the NAND-circuits 2110 and 2210 each include a sixth PFET 2111P/2211P, a seventh PFET 2112P/2212P, an eighth PFET 2113P/2213P, a sixth NFET 2114N/2214N, a seventh NFET 2115N/2215N and an eighth NFET 2116N/2216N.

The drain of the sixth PFET 2111P/2211P, the drain of the seventh PFET 2112P/2212P and the drain of the eighth PFET 2113P/2213P are connected to VDD. The source of the sixth PFET 2111P/2211P, the source of the seventh PFET 2112P/2212P and the source of the eighth PFET 2113P/2213P are connected to one another.

Symmetrically, the source of the sixth NFET 2111N/2211N, the source of the seventh NFET 2112N/2212N and the source of the eighth NFET 2113N/2213N are connected to ground. The drain of the sixth NFET 2111N/2211N, the drain of the seventh NFET 2112N/2212N and the drain of the eighth NFET 2113N/2213N are connected to one another.

Further, the gate of the sixth PFET 2111P/2211P and the gate of the sixth NFET 2111N/2211N are connected to the third operand input c_1/zn_1. The gate of the seventh PFET 2112P/2212P and the gate of the seventh NFET 2112N/2212N are connected to the first operand input a_1/dn_1. The gate of the eighth PFET 2113P/2213P and the gate of the eight NFET 2113P/2213P are connected to the second operand input b_1/coutn_0.

In the embodiment shown in FIG. 2, the AND-circuits 2120 and 2220 each include a ninth PFET 2121P/2221P and a ninth NFET 2121N/2221N. The drain of the ninth PFET 2121P/2221P is connected to the source of the sixth PFET 2111P/2211P. The source of the ninth NFET 2121N/2221N is connected to the drain of the sixth NFET 2111N/2211N. The drain of the ninth NFET 2121N/2221N is connected to the source of the ninth PFET 2121P/2221P.

The gate of the ninth NFET 2121N/2221N and the gate of the ninth PFET 2121P/2221P are connected and receive the inverted carry output coutn_1/car_1. The drain of the ninth NFET 2121N/2221N transmits the inverted sum output zn_1/s_1.

The first sub-cell 2221 and the second sub-cell 2222 each include a NOR-circuit 2130/2230 transmitting the result of a NOR operation on the three operand inputs a_1, b_1, c_1 and dn_1, coutn_0, zn_1, respectively, as the inverted sum output zn_1/s_1.

In the embodiment shown in FIG. 2, the NOR-circuits 2130 and 2230 each include a tenth PFET 2131P/2231P, an eleventh PFET 2132P/2232P, a twelfth PFET 2133P/2233P, a tenth NFET 2131N/2232N, an eleventh NFET 2132N/2232N and a twelfth NFET 2133N/2233N.

The drain of the tenth PFET 2131P/2232P is connected to VDD, the drain of the eleventh PFET 2132P/2232P is connected to the source of the tenth PFET 2131P/2232P. Further, the drain of the twelfth PFET 2133P/2233P is connected to the source of the eleventh PFET 2232P. Symmetrically, the drain of the tenth NFET 2131N/2232N is connected to ground. The source of the eleventh NFET 2132N/2232N is connected to the drain of the tenth NFET 2131N/2232N. The source of the twelfth NFET 2133N/2233N is connected to the drain of the eleventh NFET 2132N/2232N.

Further, the source of the twelfth PFET 2133P/2233P and the drain of the twelfth NFET 2133N/2233N are connected to one another and to the output of the NOR-circuit 2130/2230.

The gate of the tenth PFET 2131P/2232P is connected to one of the first operand input a_1/dn_1 the second operand input b_1/coutn_0 and the third operand input c_1/zn_1. The gate of the ellevent PFET 2132P/2232P is connected to another one of the first operand input a_1/dn_1 the second operand input b_1/coutn_0 and the third operand input c_1/zn_1. The gate of the twelfth PFET 2133P/2233P is connected the remaining one of the first operand input a_1/dn_1 the second operand input b_1/coutn_0 and the third operand input c_1/zn_1.

The gate of the tenth NFET 2131N/2231N is connected to one of the first operand input a_1/dn_1 the second operand input b_1/coutn_0 and the third operand input c_1/zn_1. The gate of the ellevent NFET 2132N/2232N is connected to another one of the first operand input a_1/dn_1 the second operand input b_1/coutn_0 and the third operand input c_1/zn_1. The gate of the twelfth NFET 2133N/2233N is connected to the remaining one of the first operand input a_1/dn_1 the second operand input b_1/coutn_0 and the third operand input c_1/zn_1.

In the embodiment shown in FIG. 2, the gates, for example, of the tenth NFET 2131N and the tenth PFET 2131P are connected to the same operand input. However, the NFETs/PFETs 2x3yZ (x=1, 2; y=1, 2, 3; Z=N, P) are connected in series. Hence, it is only important that each of the NFETs connected in series receives a different one of the three operand inputs and each of the PFETs connected in series are receives a different one of the three operand inputs.

Figure 3:
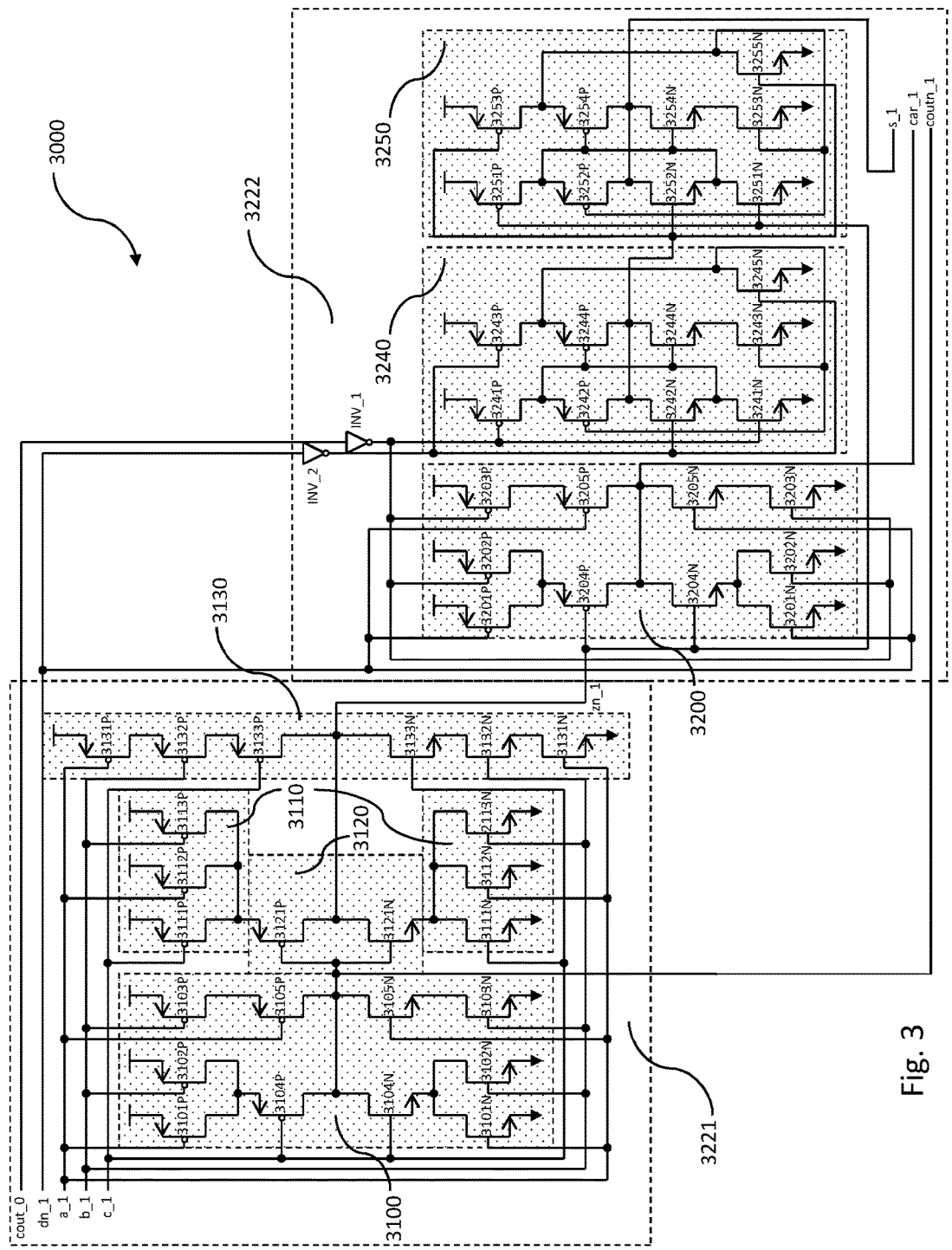
FIG. 3 shows a sub-circuit of a circuit for addition of multiple binary numbers, in accordance with one or more aspects of the present invention.

FIG. 3 shows another embodiment of a bit cell 3000 of a circuit for addition of multiple binary numbers. The bit cell 3000 may correspond to the bit cell 1220 of FIG. 1.

The bit cell 3000 includes a first sub-cell 3221 and a second sub-cell 3222. The structure of the first sub-cell 3221 is identical to the structure of the sub-cell 2221, wherein the transistors 31rsT (r=0, 1, 2, 3; s=1, 2, 3, 4, 5; T=N, P) correspond to the transistors 21rsT.

The second sub-cell 3222 includes a XOR-circuit 3200 like the first sub-cell 3221 and the first sub-cell 2221 and the second sub-cell 2222 shown in FIG. 2. However, the second sub-cell 3222 differs from the first sub-cell 3221 and the first sub-cell 2221 and the second sub-cell 2222 shown in FIG. 2 in the remaining elements.

The second sub-cell 3222 includes a first XOR-circuit 3240 and a second XOR-circuit 3250. Each of the first XOR-circuit 3240 and the second XOR-circuit 3250 include a thirteenth PFET 3241P/3251P, a fourteenth PFET 3242P/3252P, a fifteenth PFET 3243P/3253P, a sixteenth PFET 3244P/3254P, a thirteenth NFET 3241N/3251N, a fourteenth NFET 3242N/3252N, a fifteenth NFET 3243N/3253N, a sixteenth NFET 3244N/3254N and a seventeenth NFET 3245N/3255N.

The drain of the thirteenth PFET 3241P/3251P and the drain of the fifteenth PFET 3243P/3253P are connected to VDD. The source of the thirteenth NFET 3241N/3251N, the source of the fifteenth NFET 3243N/3253N and the source of the seventeenth NFET 3245N/3255N are connected to ground. The source of the thirteenth PFET 3241P/3251P is connected to the drain of the fourteenth PFET 3242P/3252P. The source of the fifteenth PFET 3243P/3253P is connected to the drain of the sixteenth PFET 3244P/3254P. The drain of the thirteenth NFET 3241N/3251N is connected to the source of the fourteenth NFET 3242N/3252N. The drain of the fifteenth NFET 3243P/3253P is connected to the source of the sixteenth NFET 3244N/3254N. Furthermore, the source of the fourteenth PFET 3242P/3252P is connected to the drain of the fourteenth NFET 3242N/3252N. The source of the sixteenth PFET 3244P/3254P is connected to the drain of the sixteenth NFET 3244N/3254N. The drain of the seventeenth NFET 3245N/3255N is connected to the source of the fifteenth NFET 3243P/3253P.

The gate of the fifteenth PFET 3243P/3253P and the gate of the fourteenth NFET 3242N/3252N and the gate of the seventeenth NFET 3245N/3255N are connected to an inverted first input. The gate of the thirteenth PFET 3241P/3251P and the gate of the thirteenth NFET 3241N/3251N are connected to an inverted second input.

The gate of the sixteenth PFET 3244P/3254P and the gate of the sixteenth NFET 3244N/3254N are connected to one another, to the source of the thirteenth PFET 3241P/3251P and the drain of the thirteenth NFET 3241N/3251N. The gate of the fourteenth PFET (3242P, 3252P) is connected to the drain of the seventeenth NFET 3245N.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A circuit for addition of multiple binary numbers, the circuit comprising a 4-to-2-compressor configured for calculating a compressed representation from four binary numbers received via operand inputs of the 4-to-2-compressor, wherein the 4-to-2-compressor comprises a first sub-circuit and a second sub-circuit, wherein each of the first sub-circuit and the second sub-circuit is configured for transmitting a bitwise inverted representation of a compressed representation from three binary numbers, and wherein the 4-to-2-compressor comprises at least one bit cell associated with the first sub-circuit and associated with the second sub-circuit.

2. The circuit of claim 1, wherein:
the at least one bit cell comprises a first sub-cell belonging to the first sub-circuit and a second sub-cell belonging to the second sub-circuit.

3. The circuit of claim 2, wherein:
at least one of the first sub-cell and the second sub-cell comprises three operand inputs, an inverted sum output and an inverted carry output.

4. The circuit of claim 3, wherein the three operand inputs of the first sub-cell and one operand input of the second sub-cell correspond to four operand inputs of the bit cell of the 4-to-2 compressor.

5. The circuit of claim 3, wherein one operand input of the second sub-cell corresponds to a carry input of the bit cell.

6. The circuit of claim 3, wherein an inverted sum output of the second sub-cell corresponds to a sum output of the bit cell and an inverted carry output of the first sub-cell corresponds to an inverted carry output of the bit cell.

7. The circuit of claim 3, wherein the inverted sum output of the first sub-cell is connected to an operand input of the second sub-cell.

8. The circuit of claim 3, wherein:
at least one of the first sub-cell and the second sub-cell comprises a XNOR-circuit transmitting the result of a XNOR operation on the three operand inputs as the inverted carry output.

9. The circuit of claim 8, wherein:
wherein the first sub-cell comprises a NOR-circuit transmitting the result of a NOR operation on the three operand inputs as the inverted sum output.

10. The circuit of claim 8, wherein:
the at least one of the first sub-cell and the second sub-cell comprises an AND-circuit receiving from a NAND-circuit the result of a NAND operation on the three operand inputs and an inverted carry output and transmitting the result as the inverted sum output.

11. The circuit of claim 2, wherein:
the second sub-cell comprises a first XOR-circuit.

12. The circuit of claim 2, wherein:
the second sub-cell is identical to the first sub-cell.

13. The circuit of claim 2, wherein:
the second sub-cell is different from the first sub-cell.

14. The circuit of claim 1, wherein the compressed representation comprises a result word and an inverted carry word and wherein the circuit comprises a conversion circuit for converting the compressed representation into a binary representation of the sum of the multiple binary numbers.

* * * * *